(12) United States Patent  
Meng et al.

(10) Patent No.: US 12,504,361 B1
(45) Date of Patent: Dec. 23, 2025

(54) INTELLIGENT POLLEN MONITORING AND ANALYSIS SYSTEM AND ITS CONTROL METHOD

(71) Applicant: Research Center for Eco-Environmental Sciences, Chinese Academy of Sciences, Beijing (CN)

(72) Inventors: Ling Meng, Beijing (CN); Liding Chen, Beijing (CN); Lei Yang, Beijing (CN); Weiqi Zhou, Beijing (CN); Hua Zheng, Beijing (CN); Guangyao Gao, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/226,252

(22) Filed: Jun. 3, 2025

Related U.S. Application Data

(63) Continuation of application No. PCT/CN2025/089683, filed on Apr. 17, 2025.

(30) Foreign Application Priority Data

Jun. 20, 2024 (CN) .......................... 202410799240.6

(51) Int. Cl.
*G01N 15/075* (2024.01)
*G01N 15/01* (2024.01)
(Continued)

(52) U.S. Cl.
CPC ........... *G01N 15/075* (2024.01); *G01N 15/01* (2024.01); *G01N 15/0606* (2013.01);
(Continued)

(58) Field of Classification Search
CPC .. G01N 15/075; G01N 15/1409; G01N 15/01; G01N 15/0606; G01N 15/1429; G01N 2015/144; G01N 2015/1486
See application file for complete search history.

(56) References Cited

U.S. PATENT DOCUMENTS

| | | | |
|---|---|---|---|
| 10,458,990 B1 * | 10/2019 | Manautou | G01N 21/6486 |
| 2002/0119769 A1 * | 8/2002 | Heinonen | G01W 1/04 |
| | | | 455/423 |
| 2013/0161244 A1 * | 6/2013 | Ishii | G01N 35/00 |
| | | | 210/91 |

FOREIGN PATENT DOCUMENTS

| | | | | |
|---|---|---|---|---|
| CN | 204286994 U | * | 4/2015 | |
| CN | 105388093 A | * | 3/2016 | ............. G01N 15/00 |

(Continued)

*Primary Examiner* — Michelle M Iacoletti
*Assistant Examiner* — Jarreas Underwood
(74) *Attorney, Agent, or Firm* — JEEN IP LAW, LLC

(57) ABSTRACT

Disclosed is an intelligent pollen monitoring and analysis system and control method. The system includes a monitoring box equipped with a control module and a support platform. The support platform is equipped with a slide storage rack, a pollen sampling assembly, an image acquisition device, and a slide transfer mechanism. The slide storage rack is arranged on a rotating mechanism, and the image acquisition device is equipped with a fine-tuning mechanism. The rotating mechanism, the pollen sampling assembly, the image acquisition device, the slide transfer mechanism, and the fine-tuning mechanism are connected to the control module. The control module is used to control the start and stop of the components, and recognize the pollen concentration and/or pollen quantity uploaded by the image acquisition device. This solution solves the problem of inaccurate pollen concentration monitoring caused by vibration during pollen transmission using sampling tape strips in existing pollen monitoring devices.

4 Claims, 12 Drawing Sheets

(51) Int. Cl.
   *G01N 15/06*   (2024.01)
   *G01N 15/14*   (2024.01)
   *G01N 15/1409*   (2024.01)
   *G01N 15/1429*   (2024.01)
   *G01N 15/1434*   (2024.01)

(52) U.S. Cl.
   CPC ..... *G01N 15/1409* (2024.01); *G01N 15/1429* (2013.01); *G01N 2015/144* (2013.01); *G01N 2015/1486* (2013.01)

(56)         References Cited

FOREIGN PATENT DOCUMENTS

| | | | | | |
|---|---|---|---|---|---|
| CN | 105388093 | B | | 3/2016 | |
| CN | 115202026 | A | | 10/2022 | |
| CN | 117538321 | A | | 8/2023 | |
| CN | 117907162 | A | * | 4/2024 | ........... G01N 1/2208 |
| CN | 117907162 | B | | 4/2024 | |
| CN | 118050531 | A | * | 5/2024 | ........... G01N 1/2208 |
| JP | H1019755 | A | | 1/1998 | |
| WO | 2016058052 | A1 | | 10/2014 | |

\* cited by examiner

INTELLIGENT POLLEN MONITORING AND ANALYSIS SYSTEM AND ITS CONTROL METHOD

CROSS-REFERENCE TO RELATED APPLICATIONS

This application is a continuation of International Application No. PCT/CN2025/089683, filed on Apr. 17, 2025, which claims priority to Chinese Patent Application No. 202410799240.6, filed on Jun. 20, 2024, which is hereby incorporated by reference in its entirety.

TECHNICAL FIELD

The present disclosure relates to the field of pollen monitoring, in particular to a intelligent pollen monitoring and analysis system and its control method.

BACKGROUND

With the increase of urban greening rate, airborne pollen air pollution is becoming increasingly serious, and the incidence rate of pollinosis shows a rising trend, affecting 10% to 30% of the global population, and the proportion of pollen allergy in China is 1% to 6%. During the flowering period, plants produce pollen with a diameter of 15-30 μm, which is large in quantity and light in weight. It is easily attached to aerosols and spreads through the air, commonly known as airborne pollen. The allergenic protein components in airborne pollen can cause pollen allergy symptoms such as runny nose, tears, skin itching, and asthma when inhaled by the human body.

In the existing technology, a pollen online monitoring system (CN201510731452.1) has been used to monitor pollen, to remind relevant meteorological departments to issue relevant warnings and take measures to reduce pollen floating based on the type and quantity of pollen, and to guide people with pollen allergies to reduce their activities in areas with high pollen indices, thereby alleviating allergy symptoms.

The existing pollen online monitoring system uses a sampling tape strip to collect pollen, and then transports the sampling tape strip to the microscope for photography in a conveyor like manner. The left rotating shaft then rolls up the sampling tape strip containing collected pollen samples that has been observed. Although online monitoring of pollen can be achieved through this method, there will be vibration when using a conveyor belt to transport the sampling tape strip. If the pollen is collected densely on the sampling tape strip, it will shake to the adjacent two sampling areas on the sampling tape strip, thereby affecting the fine collection of pollen concentration. The photographed sampling tape strip is rolled up, and the pollen on the sampling tape strip will interfere with each other, thereby preventing the tape strip from being retrieved for reanalysis. This limitation significantly hinders data provenance and traceability in scenarios where the collected data requires validation or source verification.

SUMMARY

In view of the aforementioned deficiency in existing technology, a intelligent pollen monitoring and analysis system and its control method provided by the present disclosure solve the problem of inaccurate pollen concentration monitoring caused by the vibration of pollen transmission using sampling tape strips in existing pollen monitoring devices.

In order to achieve the above objectives, the technical solution adopted by the present disclosure are shown as below:

In the first aspect, a intelligent pollen monitoring and analysis system is provided by the present disclosure, which includes a monitoring box, wherein a control module and a support platform are installed inside the monitoring box, the support platform is equipped with a slide storage rack configured to store multiple slides that are not overlapped to each other, a pollen sampling assembly configured to inhale external ambient air and collect pollen from the air onto the slides inside through a volumetric method, an image acquisition device configured to enlarge pollen images on the slides for image acquisition, and a slide transfer mechanism configured to grab the slides on the slide storage rack and transfer the slides grabbed to the pollen sampling assembly and the image acquisition device.

The slide storage rack is arranged on a rotating mechanism, and the image acquisition device is provided with a fine-tuning mechanism to adjust the slide in X-Y-Z directions; the rotating mechanism, the pollen sampling assembly, the image acquisition device, the slide transfer mechanism, and the fine-tuning mechanism are all connected to the control module; the control module is configured to control start and stop of the connected components, recognize pollen concentration and/or pollen quantity from the pollen images uploaded by the image acquisition device, and send the pollen images and the concentration and/or the pollen quantity to the external management end.

Further, the pollen sampling assembly includes a bottom plate and a pollen sampling chamber formed by interlocking a slide cover and a buffer plate, wherein a vertical plate extending in the vertical direction is installed on the bottom plate, the slide cover is fixed to the vertical plate, a linear guide rail that slides with the buffer plate is provided on the vertical plate below the slide cover, and a through type stepper motor is installed on the bottom plate to drive the buffer plate and the slide cover to be interlocked/separated.

The inner surface of the buffer plate is provided with a slide placement table that slides along the X-axis direction relative to the buffer plate; the slide cover is fixed with a driving mechanism configured to drive the slide placement table to slide; the top of the slide cover is connected with an inlet pipe that extends out of the monitoring box to introduce external air and impact the slide; the side wall of the slide cover is provided with an exhaust hole connected to an exhaust fan; and the through type stepper motor and the driving mechanism are both electrically connected to the control module.

Further, the lower surface of the buffer plate is connected to a pressure plate through a plurality of plain shaft screws; a diameter of a hole on the pressure plate for each plain shaft screw to pass through is larger than a diameter of each plain shaft screw; the pressure plate is fixedly connected to a lead screw of the through type stepper motor, and a spring are sleeved on each plain shaft screw between the pressure plate and the buffer plate.

Further, the driving mechanism includes a driving motor fixed on an outer surface of the side wall of the slide cover, a screw shaft of the driving motor penetrates into the slide cover through a sealing plate, the screw shaft is sleeved with a first screw nut, and the first screw nut is provided with a limit plate extending vertically towards a direction of the buffer plate; the side of the slide placement table is provided with a limit groove, and when the buffer plate is fastened with the slide cover, the limit plate are inserted into the limit groove; and the driving motor is electrically connected to the control module.

Further, the slide transfer mechanism includes a transfer claw and a rotating table that drives the transfer claw to rotate 360°; the rotating table is fixed with a support block, and a first lifting mechanism that drives the transfer claw to rise and fall in a vertical direction is installed on the support block; the first lifting mechanism is provided with a lifting platform, and a first mobile mechanism configured to drive the transfer claw to move linearly in a horizontal plane is installed on the lifting platform; the rotating table, the first lifting mechanism, and the first mobile mechanism are all connected to the control module.

Further, the transfer claw includes a plate-like member fixed to the first mobile mechanism, and a non installation end of the plate-like member forks to form a U-shape fork; two arms of the U-shape fork are at least two extension strips for supporting the slide, and an outermost extension strip is provided with an L-shaped groove that contacts an edge of the slide; a receiving groove with a length equal to the maximum width of the slide is provided on a non outermost extension strip for holding the slide.

Further, the image acquisition device includes a microscope without an eyepiece, wherein a camera electrically connected to the control module is installed at an installation position for the eyepiece of the microscope to install, and the fine-tuning mechanism is installed on a microscope arm of the microscope;

The fine-tuning mechanism includes a slide holder, an L-shaped sliding table, and a second lifting mechanism fixed on the microscope arm for lifting a carrier stage of the microscope along the Z-axis direction; a short side of the sliding table is fixedly connected to the carrier stage; a mounting plate of the long side of the sliding table extends upward from the side of the carrier stage, and the top surface of the sliding table is located above the carrier stage;

The sliding table is fixed on the second mobile mechanism arm and slides in the sliding groove through the second mobile mechanism, the second mobile mechanism is mounted on the second lifting mechanism to follow the second lifting mechanism in lifting and lowering along the Z-axis; a third mobile mechanism configured to drive the slide holder to slide along the X-axis direction is fixed on the side of the mounting plate towards the carrier stage.

Further, the slide carrier includes an L-shaped sliding plate, the short side of the L-shaped sliding plate is fixed to a second screw nut of the third mobile mechanism, the long side of the L-shaped sliding plate extends along the length direction of a lead screw of the third mobile mechanism and is fixedly installed with a tray having two cantilevers, and a clamp slot for clamping the slides is opened on the cantilevers.

Further, the control module includes a microcomputer and an electrical box that are interconnected; the rotating mechanism, the pollen sampling assembly, the image acquisition device, the slide transfer mechanism, and the fine-tuning mechanism are all connected to the electrical box and backup power supply; the microcomputer is embedded with execution programs for controlling the rotating mechanism, the pollen sampling assembly, the image acquisition device, the slide transfer mechanism, and the fine-tuning mechanism; the microcomputer is connected to an input module placed inside the monitoring box, and the input module is configured to adjust the embedded execution programs; the inner side of the door panel of the monitoring box is fixed with a monitor that is electrically connected to the microcomputer.

Further, the monitoring box is further provided with a temperature sensor, a humidity sensor, an air conditioner that maintains an internal temperature of the monitoring box at a preset temperature, and a dehumidifier that performs dehumidification when an internal humidity of the monitoring box exceeds a preset humidity; and the temperature sensor, the humidity sensor, the air conditioner, and the dehumidifier are all electrically connected to the control module.

In the second aspect, a control method of the intelligent pollen monitoring and analysis system is provided by the present disclosure, which includes the following steps:

C1, determining whether the pollen sampling assembly has completed the pollen collection of at least one slide; if yes, proceed to step C2, otherwise, proceed to step C4;

C2, reading the number of sampling areas on the slide in the pollen sampling assembly and sampling duration of a last sampling area, and calculating the difference between a deadline for the last sampling area and a deadline for a total sampling time;

C3, when the difference value is equal to zero, opening the pollen sampling assembly, and transferring the completed pollen collection slide to its initial storage position on the slide storage rack, and then, proceed to step C4; when the difference value is greater than zero, proceed to step C4;

C4, at the sampling start time of the slide to be sampled, reading a serial number of the slide to be sampled, and activating the rotating mechanism to rotate the slide corresponding to the serial number on the slide storage rack to a grasping side of the slide transfer mechanism;

C5, activating the slide transfer mechanism to grab the slide corresponding to the serial number and transfer the slide corresponding to the serial number into an interior of the opened pollen sampling assembly, then closing the pollen sampling assembly;

C6, moving, by the pollen sampling assembly, the sampling area on the slide to align with an air inlet based on the number of sampling areas on the slide and the sampling duration of each sampling area, and performing pollen sampling by air suction impacting the corresponding area of the slide.

The advantageous effects of the present disclosure are as follows: this technical solution uses slides for pollen collection, and then cooperates with a slide transfer mechanism to grasp the slides for transfer. During the transfer process, a clamping method is used to transfer a single slide without vibration, which can prevent pollen from entering adjacent sampling areas and ensure the accuracy of pollen concentration and quantity detection.

In this technical solution, the completed image acquisition slides are placed on a slide storage rack, with no overlap between the slides. The pollen on the slides will not affect each other, allowing for the retrieval and storage of the slides. When data anomalies are found in subsequent scientific research, the stored slides can be retrieved to facilitate traceability.

This technical solution uses a slide cover and a buffer plate to form a pollen sampling chamber, combined with a through type stepper motor to quickly lift and lower the buffer plate, to achieve rapid insertion and removal of slides. After the buffer plate is fully in contact with the slide cover, the through type stepper motor will continue to move upwards with the pressure plate. The elastic force generated by the compression of spring can apply a certain pressure to the buffer plate to improve the sealing of the pollen sampling chamber, thereby avoiding external air leakage from contaminating the collected samples and making the actual flow rate at the nozzle lower than the set value.

The reference marks in drawings: 1. monitoring box; 11. door panel; 12. supporting feet; 13. support platform; 2. slide storage rack; 21. connecting shaft; 22. platform plate; 221. arm support; 2211. boss; 3. rotating mechanism; 4. pollen sampling assembly; 41. pollen sampling chamber; 411. slide cover; 4111. exhaust hole; 412. buffer plate; 4121. plain shaft screw; 4122. pressure plate; 413. slide placement table; 4131. limit groove; 4132. sliding block; 4133. slide limit plate; 414. inlet pipe; 415. hall sensor; 42. bottom plate; 421. vertical plate; 422. through type stepper motor; 43. driving mechanism; 431. driving motor; 432. screw shaft; 433. first screw nut; 4331. limit plate;

5. image acquisition device; 51. microscope; 511. microscope arm; 52. camera; 53. carrier stage; 6. fine-tuning mechanism; 61. slide holder; 611. sliding plate; 612. tray; 6121. cantilever; 62. sliding table; 621. mounting plate; 63. second lifting mechanism; 64. second mobile mechanism; 65. third mobile mechanism; 651, a second screw nut; 7. control module; 71. monitor; 72. electrical box; 73. backup power supply; 74. input module; 75. dehumidifier; 8. slide; 9. slide transfer mechanism; 91. transfer claw; 911. plate-like member; 912. extension strip; 92. rotating table; 93. support block; 94. first lifting mechanism; 95. lifting platform; 96. first mobile mechanism.

DETAILED DESCRIPTION OF THE EMBODIMENTS

The specific embodiments of the present disclosure are described below for the convenience of those skilled in the art to understand the present disclosure. However, it should be clear that the present disclosure is not limited to the scope of the specific embodiments. For ordinary skilled persons in the art, as long as various changes are within the spirit and scope of the present disclosure as defined and determined by the appended claims, these changes are obvious, and all disclosures and creations utilizing the concept of the present disclosure are protected.

Figure 1:
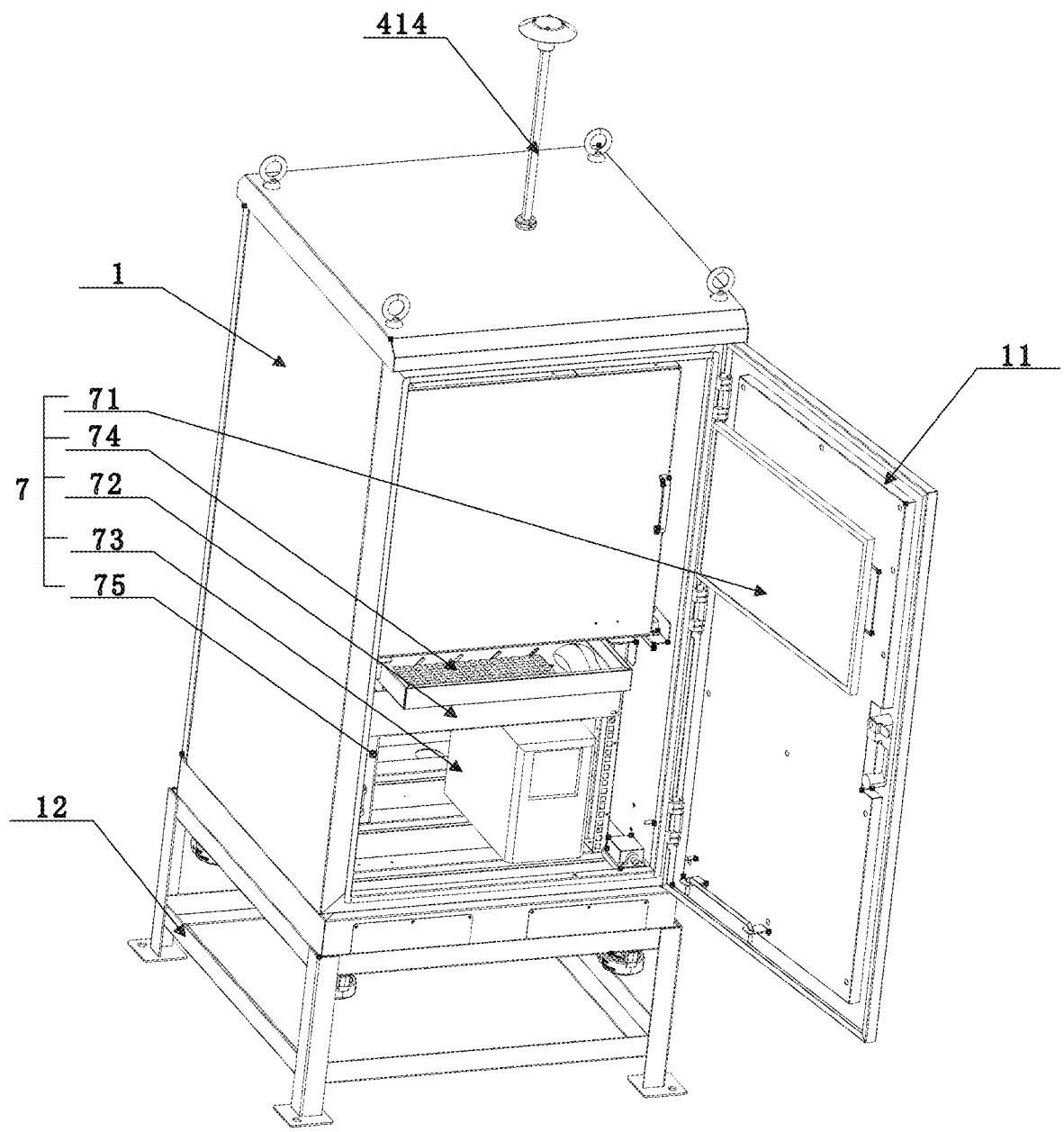
FIG. 1 is a perspective view of a intelligent pollen monitoring and analysis system with the cabinet door opened.
Figure 11:
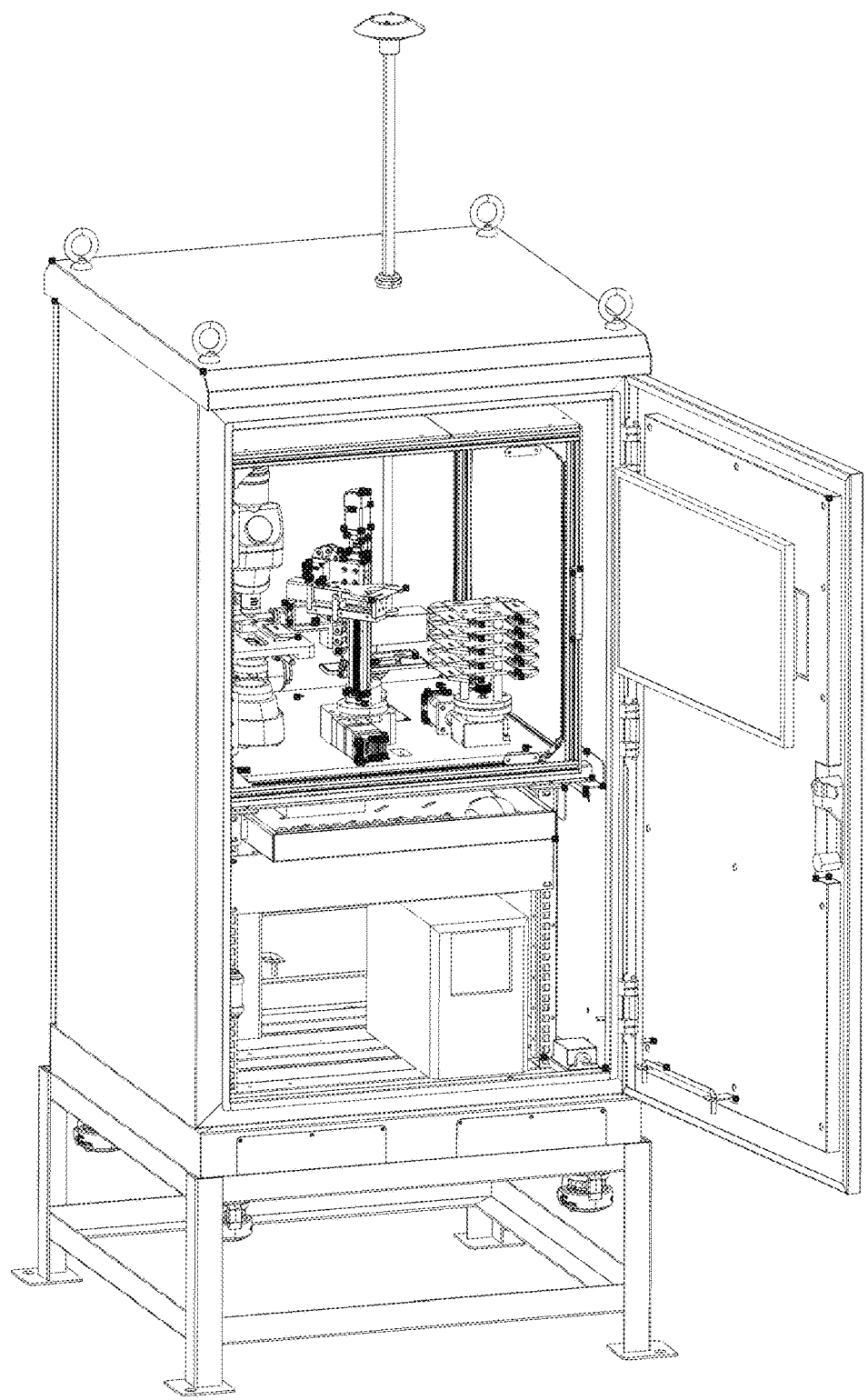
FIG. 11 is a perspective view of the intelligent pollen monitoring and analysis system in FIG. 1 after removing the upper plate inside the box.

As shown in FIG. 1 and FIG. 11, the intelligent pollen monitoring and analysis system provided by this technical solution includes a monitoring box 1. Preferably, the monitoring box 1 is a box with an openable door panel 11, and a plurality of supporting feet 12 are arranged at the bottom of the monitoring box 1 to keep the monitoring box 1 at a certain distance from the ground and reduce the interference of the ground environment on the monitoring box 1.

Figure 2:
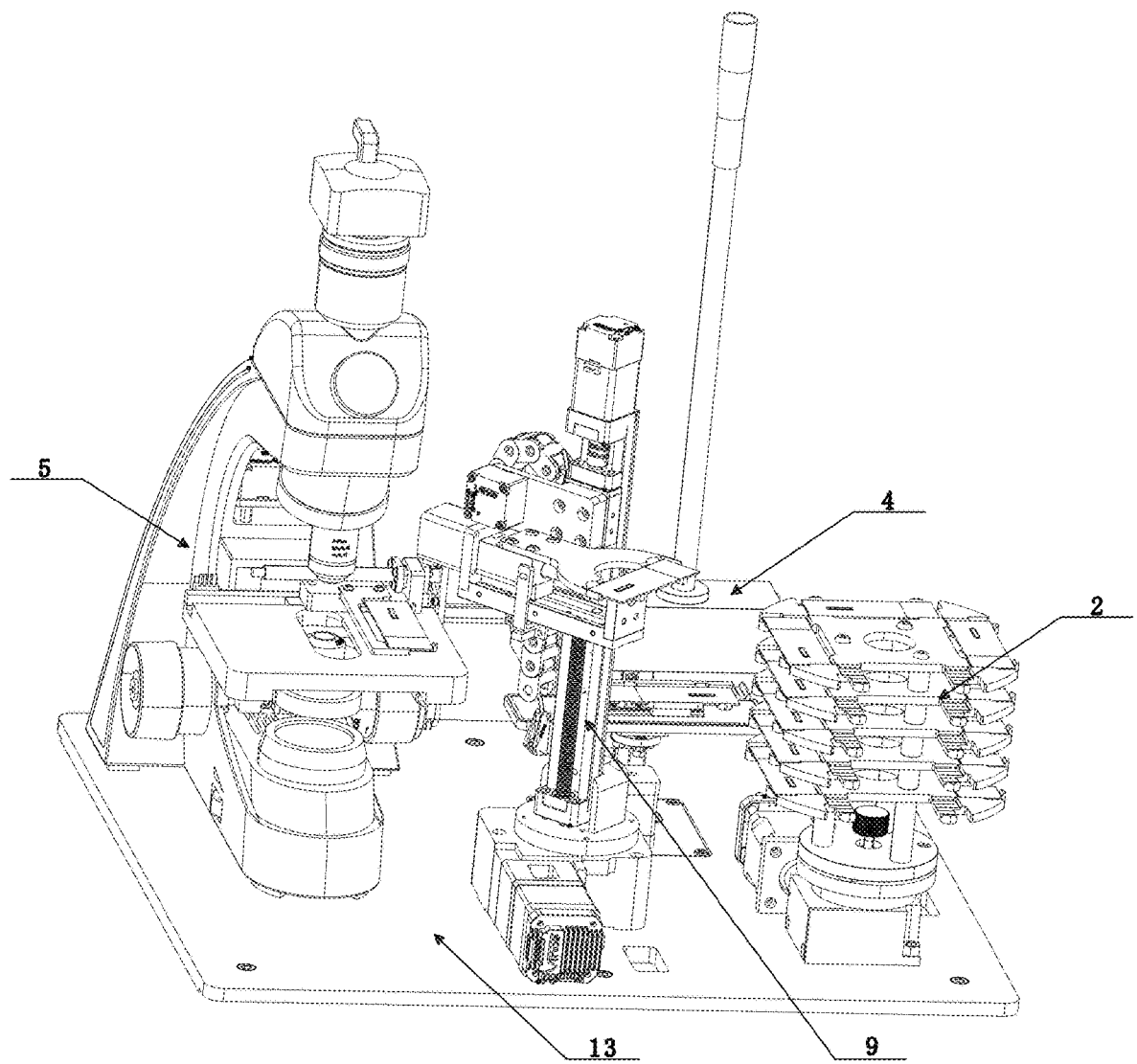
FIG. 2 is a perspective view of a slide storage rack, a pollen sampling assembly, an image acquisition device, and a slide transfer mechanism installed on the support platform.

As shown in FIG. 2, the monitoring box 1 is provided with a control module 7 and a support platform 13. The support platform 13 is provided with a slide storage rack 2 for storing a plurality of non overlapping slides 8, a pollen sampling assembly 4 for inhaling external ambient air and collecting pollen from the air onto the slides 8 inside using the volumetric method, an image acquisition device 5 for enlarging the pollen image on the slides 8 for image acquisition, and a slide transfer mechanism 9 for grabbing the slides 8 on the slide storage rack 2 and transferring the slides 8 grabbed to the pollen sampling assembly 4 and the image acquisition device 5.

Figure 6:
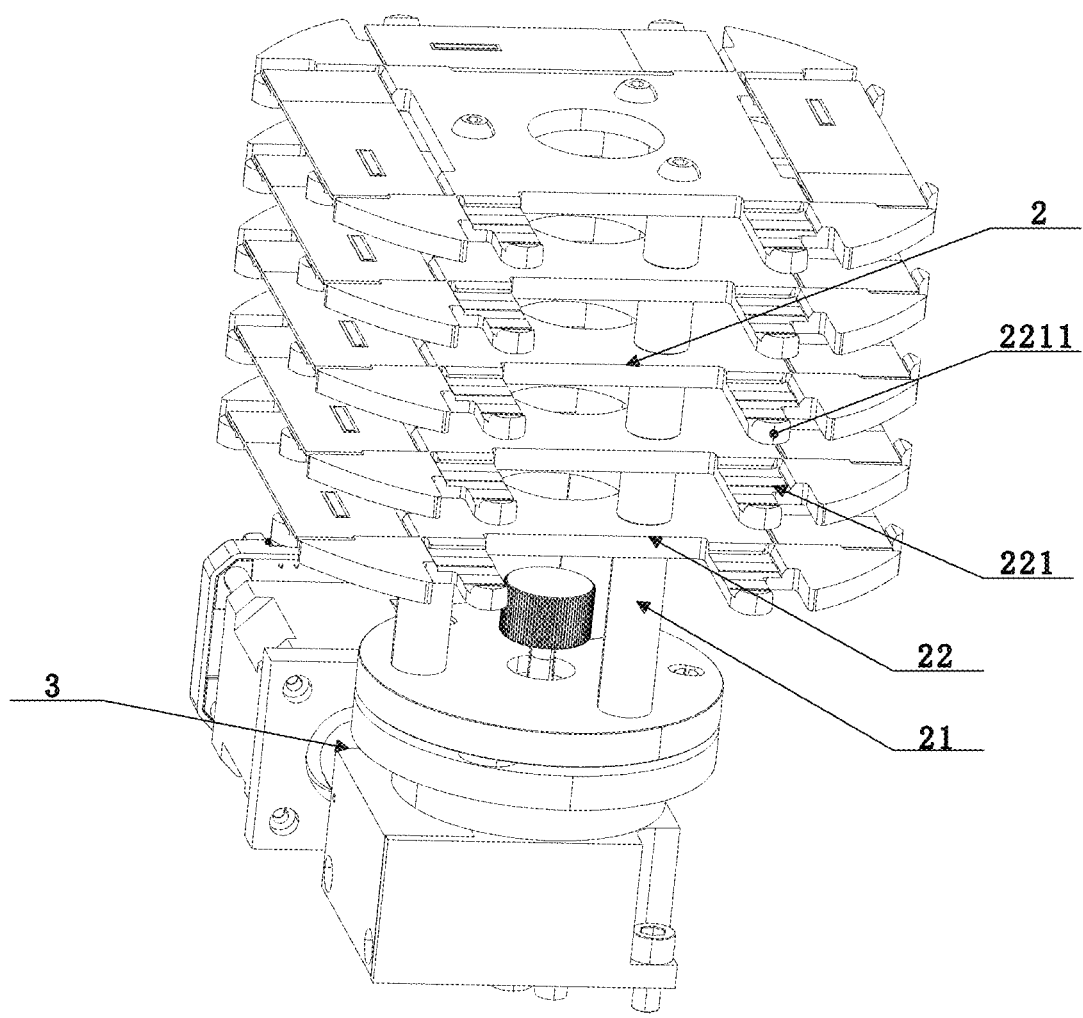
FIG. 6 is a perspective view of the slide storage rack.

As shown in FIG. 6, the slide storage rack 2 is arranged on the rotating mechanism 3. The rotating mechanism 3 can use a high-precision electric turntable that is relatively mature in the existing technology, or use a servo motor to drive the worm gear and transmit the power to a platform fixed on the worm gear, and the slide storage rack 2 is placed on the platform.

The slide storage rack 2 is a multi-layer structure formed by connecting a plurality of platform plates 22 together through a connecting shaft 21. Preferably, this technical solution has arm supports 221 for placing slides 8 in four directions on each platform plate 22, and the arm supports 221 have bosses 2211 to prevent the slides 8 from slipping off. This technical solution sets the structure for placing the slides 8 on platform plate 22 as arm supports 221, which facilitates the slide transfer mechanism 9 to hold up the slide 8 from underneath the slide 8, and complete the retrieval and placement of the slides 8.

Figure 9:
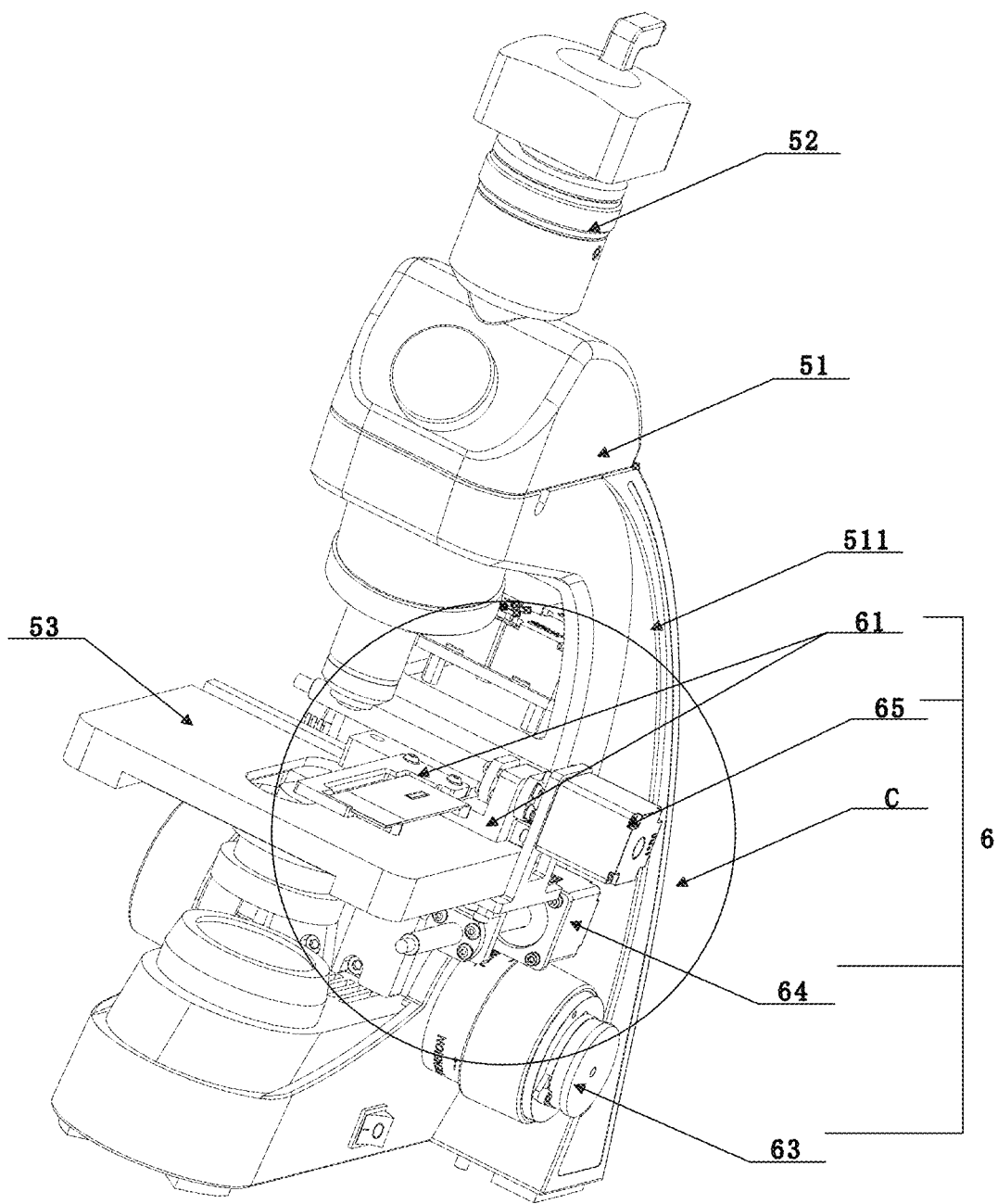
FIG. 9 is a perspective view of the image acquisition device.

As shown in FIG. 9, the image acquisition device 5 is provided with a fine-tuning mechanism 6 for adjusting the slide 8 in the X, Y and Z direction. The X-axis and Y-axis mentioned in this technical solution are located on the horizontal plane, and the Z-axis is located on the vertical plane. Please refer to the coordinate directions in FIG. 4 for details. The image acquisition device 5 includes a microscope 51 without an eyepiece, and a camera 52 electrically connected to the control module 7 is installed at the installation position of the eyepiece of the microscope 51. The fine-tuning mechanism 6 is installed on the microscope arm 511 of the microscope 51.

The fine-tuning mechanism 6 includes a slide holder 61, a sliding table 62 in L shape, and a second lifting mechanism 63 fixed to the microscope arm 511 for lifting the carrier stage 53 of the microscope 51 along the Z-axis. The short side of the sliding table 62 is fixed connected to the lower surface of the carrier stage 53. A mounting plate 621 on the long side of the sliding table 62 extends upward from the side of the carrier stage 53, and the top surface of the mounting plate 621 is located above the carrier stage 53.

The sliding table 62 is fixed to the second mobile mechanism 64, the second mobile mechanism 64 is mounted on the second lifting mechanism 63 to follow the second lifting mechanism in lifting and lowering along the Z-axis. A third mobile mechanism 65 configured to drive the slide holder 61 to slide along the X-axis direction is fixed on the side of the mounting plate 621 towards the carrier stage 53.

When the fine-tuning mechanism 6 is working, the second lifting mechanism 63 is lifted and lowered along with the second mobile mechanism 64, carrying the carrier stage 53, the second mobile mechanism 64, and the third mobile mechanism 65. The second mobile mechanism 64 also moves along with the carrier stage 53 and the third mobile mechanism 65 in the Y-axis, while the third mobile mechanism 65 slides along the slide holder 61 in the X-axis direction.

Figure 10:
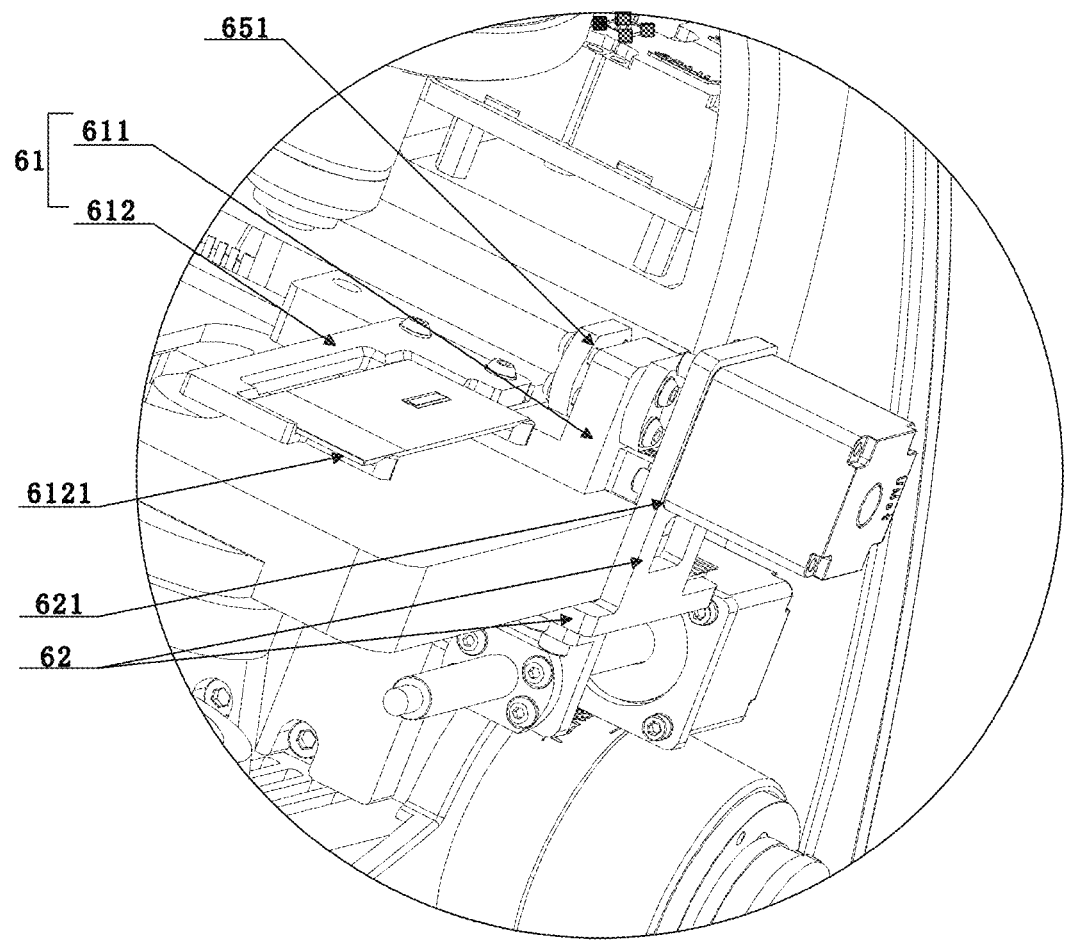
FIG. 10 is an enlarged view of part C in FIG. 9.

As shown in FIG. 10, the slide holder 61 includes a sliding plate 611 in L shape. The plate body of the short side of the sliding plate 611 is fixed to the a second screw nut 651 of the third mobile mechanism 65, the plate body of the long side of the sliding plate 611 extends along the length direction of the lead screw of the third mobile mechanism 65, a tray 612 with two cantilevers 6121 is fixedly installed on the sliding plate 611, and a clamp slot for clamping the slides 8 is opened on the cantilevers 6121.

The second lifting mechanism 63 of the image acquisition device 5 can use an electric push rod or use a servo motor to drive the worm gear to rotate, and the power is transmitted to the worm gear with threads in the middle and upper sections. In this way, when the worm gear rotates, it can drive the nut on its threaded section to slide up and down, so as to drive the carrier stage 53 connected to the nut to move up and down. The second lifting mechanism 63 can also be combined with the original gear-rack lifting mechanism of the microscope, replacing the original right coarse focus knob and fine focus knob with a stepper motor to perform the up and down autofocus function of the carrier stage. The second mobile mechanism 64 and the third mobile mechanism 65 both adopt a motor screw-nut structure, which is a relatively mature structure in the existing technology, so here is not described in detail for brevity.

The rotating mechanism 3, the pollen sampling assembly 4, the image acquisition device 5, the slide transfer mechanism 9, and the fine-tuning mechanism 6 are all connected to the control module 7. The control module 7 is used to control the start and stop of the components connected to the control module 7, recognize the pollen concentration and/or pollen quantity from the image uploaded by the image acquisition device 5, and send the image and the pollen concentration and/or pollen quantity to the external management end.

This technical solution recognizes the pollen concentration and/or pollen quantity from images, using mature image recognition methods in existing technology or trained neural network models. These are relatively mature technologies in the existing field, and here is not descried details for brevity.

Referring again to FIG. 1, the control module 7 includes a microcomputer and an electrical box 72 connected to each other. The rotating mechanism 3, the pollen sampling assembly 4, the image acquisition device 5, the slide transfer mechanism 9, and the fine-tuning mechanism 6 are all connected to the electrical box 72 and the backup power supply 73. The backup power supply 73 can provide short-term power supply when the intelligent pollen monitoring and analysis system suddenly loses power, so as to save the running or processed data and avoid the loss of some recognized data caused by sudden power failure.

The microcomputer is internally embedded with execution programs for controlling the rotating mechanism 3, the pollen sampling assembly 4, the image acquisition device 5, the slide transfer mechanism 9, and the fine-tuning mechanism 6. The microcomputer is connected to the input module 74 placed inside the monitoring box 1, and the input module 74 is used to adjust the embedded execution programs. The inner side of the door panel 11 of the monitoring box 1 is fixed with a monitor 71 that is electrically connected to the microcomputer.

The arrangements of the input module 74 and the monitor 71 is helpful in updating the internal execution programs of the microcomputer for management personnel, ensuring that the rotating mechanism 3, the pollen sampling assembly 4, the image acquisition device 5, the slide transfer mechanism 9, and the fine-tuning mechanism 6 adopt the optimal way for intelligent monitoring of pollen.

The monitoring box 1 is further provide with a temperature sensor, a humidity sensor, an air conditioner that maintains the internal temperature of the monitoring box 1 at a preset temperature, and a dehumidifier 75 that performs dehumidification when the internal humidity of the monitoring box 1 is greater than the preset humidity. The temperature sensor, the humidity sensor, the air conditioner, and the dehumidifier 75 are all electrically connected to the control module 7.

The air conditioner can keep all components inside the monitoring box 1 working at a constant temperature, ensuring their normal operation in a sealed environment. The dehumidifier 75 can remove water vapor from the monitoring box 1 to avoid affecting the operation of internal electrical components in humid weather.

Figure 3:
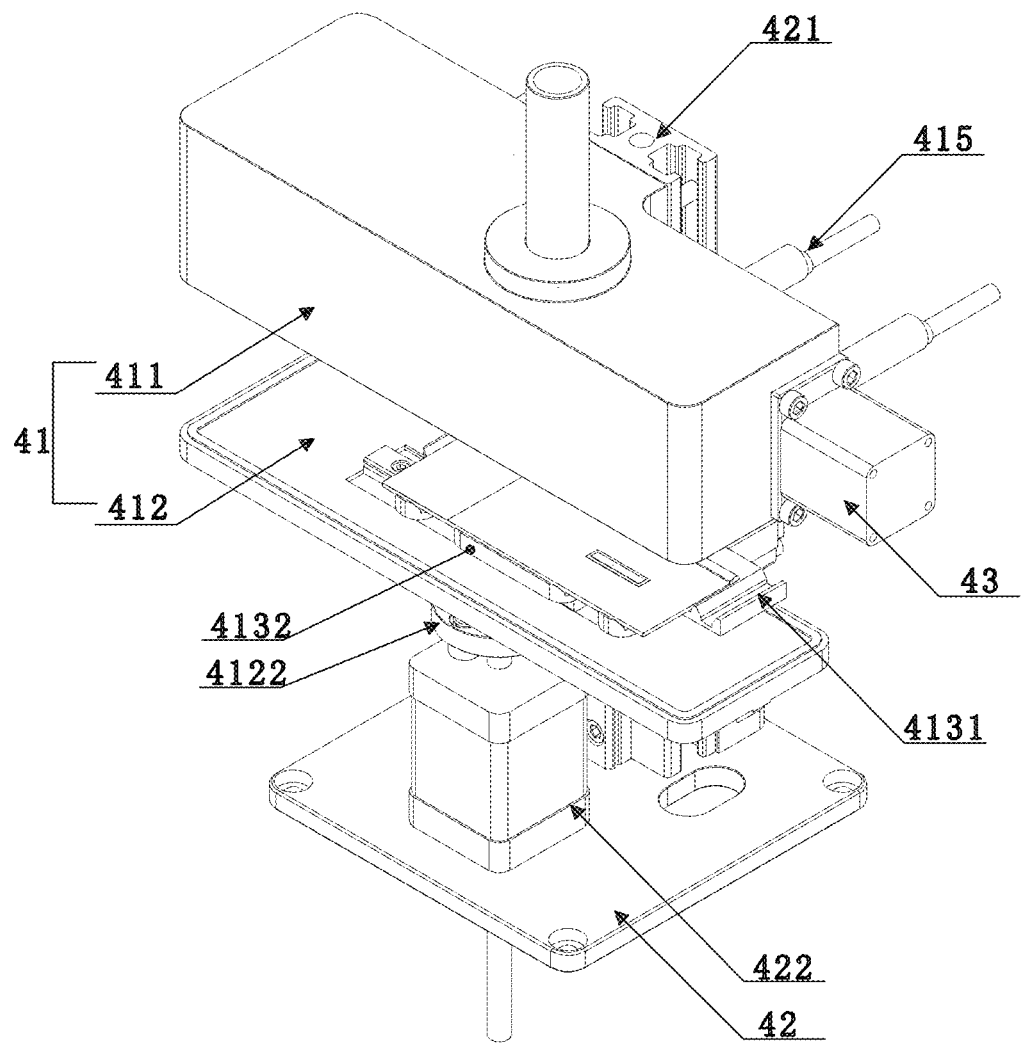
FIG. 3 is a perspective view of the pollen sampling assembly with the buffer plate in an open state.

As shown in FIG. 3, the pollen sampling assembly 4 provided by this technical solution includes a bottom plate 42 and a pollen sampling chamber 41 formed by interlocking a slide cover 411 and a buffer plate 412. A vertical plate 421 extending in the vertical direction is installed on the bottom plate 42, and the slide cover 411 is fixed to the vertical plate 421. A linear guide rail that slides with the buffer plate 412 is provided on the vertical plate 421 below the slide cover 411. The linear guide rail is arranged in the vertical direction, and the buffer plate 412 is fixed on the slider of the linear guide rail.

A through type stepper motor 422 is installed on the bottom plate to drive the buffer plate 412 and the slide cover 411 for interlocking/separating.

The inner surface of the buffer plate 412 is provide with a slide placement table 413 that slides along the X-axis direction relative to the buffer plate 412. The slide cover 411 is fixed with a driving mechanism 43 that drives the slide placement table 413 to slide. The top of the slide cover 411 is communicated with an inlet pipe 414 that introduces external air and impacts the slide 8. The inlet pipe 414 is located at the end of the pollen sampling chamber 41 and is connected to a rectangular sampling nozzle. An exhaust hole 4111 connected to the exhaust fan is installed on the side wall of the slide cover 411.

Figure 5:
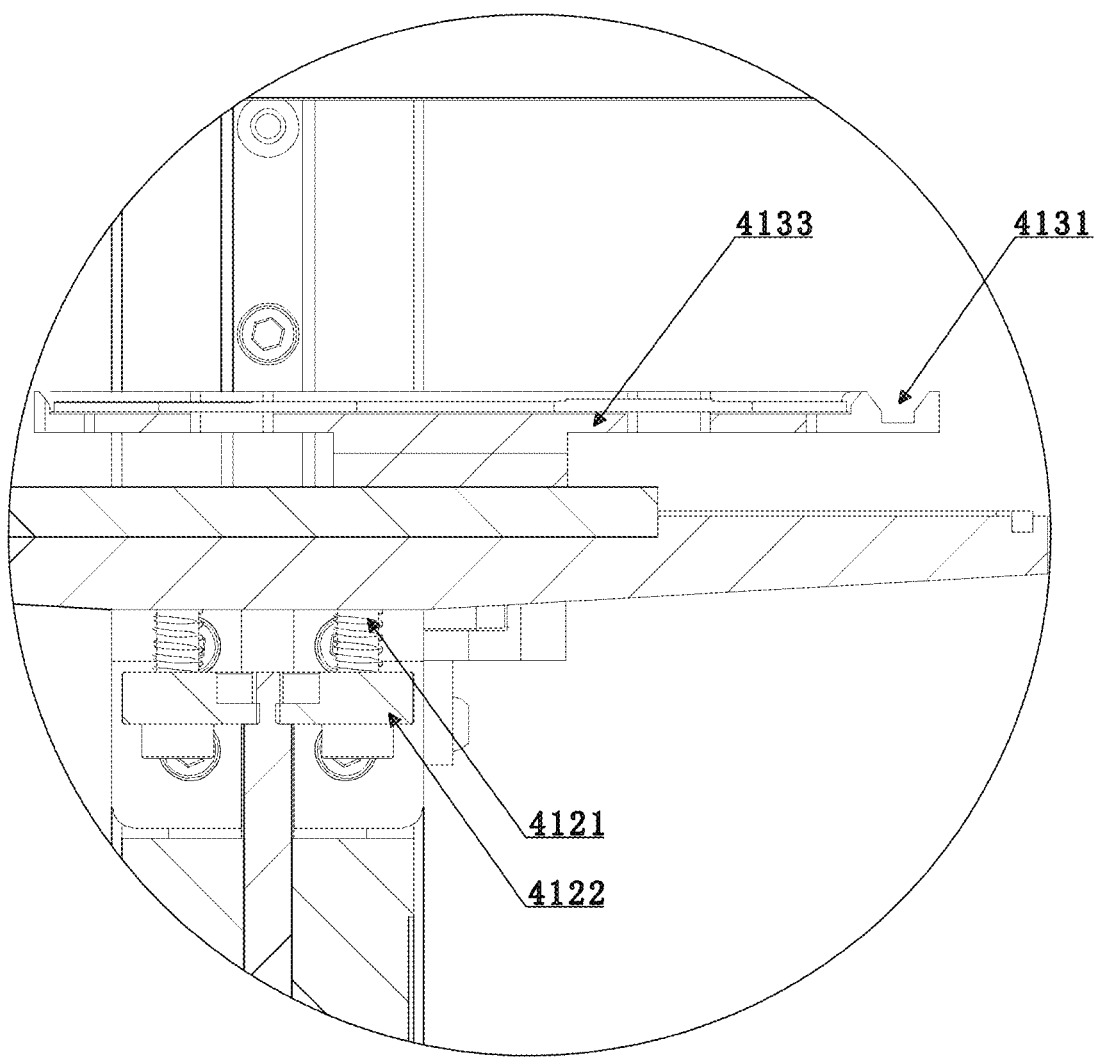
FIG. 5 is an enlarged view of part A in FIG. 4.

As shown in FIG. 5, the lower surface of the buffer plate 412 is connected to a pressure plate 4122 through a plurality of plain shaft screws 4121. The diameter of the hole on the pressure plate 4122 for the plain shaft screws 4121 to pass through is larger than that of the plain shaft screws 4121. The pressure plate 4122 is fixedly connected to the lead screw of the through type stepper motor 422, and a spring is sleeved on each plain shaft screws 4121 between the pressure plate 4122 and the buffer plate 412.

After adopting the above structure in this technical solution, one power component (through type stepper motor 422) can drive the two components to move step by step, which can not only ensure the accurate alignment and locking of the slide cover 411 and the buffer plate 412, but also exert pressure on the locked buffer plate 412 through the spring, thus improving the sealing performance of the pollen sampling chamber 41.

Figure 4:
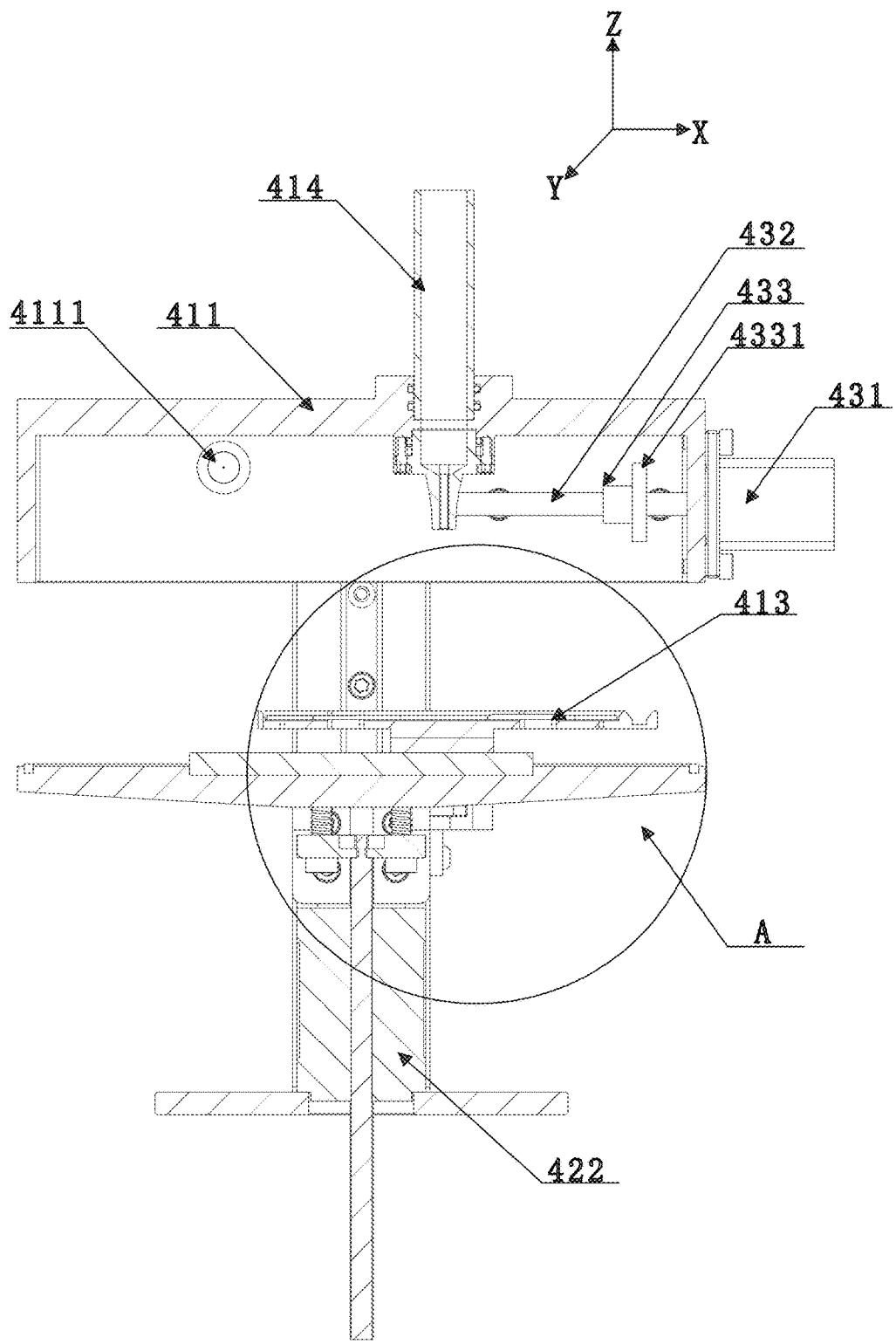
FIG. 4 is a sectional view of the pollen sampling assembly with the buffer plate in an open state.

As shown in FIG. 4, the driving mechanism 43 includes a driving motor 431 fixed on the outer surface of the side wall of the slide cover 411. The screw shaft of the driving motor 431 penetrates into the slide cover 411 through a sealing plate. The screw shaft 432 is sleeved with a first screw nut 433, and the first screw nut 433 has a limit plate 4331 extending vertically towards the buffer plate 412 direction. A limit groove 4131 is arranged on the side of the slide placement table 413. When the buffer plate 412 is fastened with the slide cover 411, the limit plate 4331 extends into the limit groove 4131.

According to the technical solution, the driving mechanism 43 and the components that need to be drives by the driving mechanism 43 are arranged on two separate structures. In this way, when the through type stepper motor 422 works, it only needs to move the lighter components, and does not require the high-power through type stepper motor 422, which to some extent reduces equipment cost investment. Furthermore, the driving motor 431 is arranged on the outside of the slide cover 411, which can prevent pollen from adhering to the driving motor 431 and affecting the driving motor 431. In addition, it can significantly reduce the internal volume of the pollen sampling chamber 41.

When moving the slide placement table 413, the clever cooperation between the limit groove 4131 and the limit plate 4331, which is in contact but not fixed, not only enables the slide placement table 413 located on the buffer plate 412 to quickly move in conjunction with the screw shaft 432, but also enables the separation of the limit plate 4331 and the limit groove 4131 without damaging the structure of the screw shaft 432 when the buffer plate 412 descends.

During implementation, preferably, the slide placement table 413 includes a sliding block 4132 and a slide limit plate 4133 fixed on the sliding block 4132 in the technical solution. The lower surface of the sliding block 4132 adjacent to the vertical plate 421 is provided with a strip-shaped groove along the X-axis direction that cooperates with the linear guide rail on the bottom plate 42. The slide limit plate 4133 is provided with a groove for placing the slide 8, and the bottom of the groove has a hollow structure to provide clearance for the transfer claw 91 for transferring the slide 8. The limit groove 4131 is arranged on the extension plate of the slide limit plate 4133 facing the driving motor 431 side. The height of the sliding block 4132 is greater than the thickness of the transfer claw 91 for transferring the glass slide 8.

It should be in close contact with the wall surface of the strip-shaped groove when installing the linear guide rail. After installation, a certain frictional resistance will be generated to prevent the sliding block 4132 from moving due to slight vibration and affecting the positioning of the limit groove. Limit positions are arranged at both ends of the linear guide rail on the bottom plate 42 to prevent the sliding block 4132 from falling off.

The sliding block 4132 can provide a certain distance between the slide limit plate 4133 and the buffer plate 412, so that the transfer claw 91 transferring the slide 8 can smoothly enter below the slide limit plate 4133 to place the slide 8 in the open groove.

During implementation, it is preferred to set the upper part of the limit slot 4131 as a flared mouth that widens outward, with the lower wall perpendicular to the slide placement table 413 and the width of the lower end equal to the thickness of the limit plate 4331. The upper structure can ensure that the limit plate 4331 accurately enters the limit slot 4131, while the lower structure can avoid loosening of the slide placement table 413 and the first screw nut 433 during movement, which affects the precise control of the displacement of the slide 8.

During implementation, it is preferred to embed a magnet on the side of the first screw nut 433 opposite to the limit plate 4331, and a hall sensor 415 electrically connected to the control module 7 is installed on the side wall of the slide cover 411. The magnet and the hall sensor 415 cooperate to limit the movement of the first screw nut 433.

Figure 7:
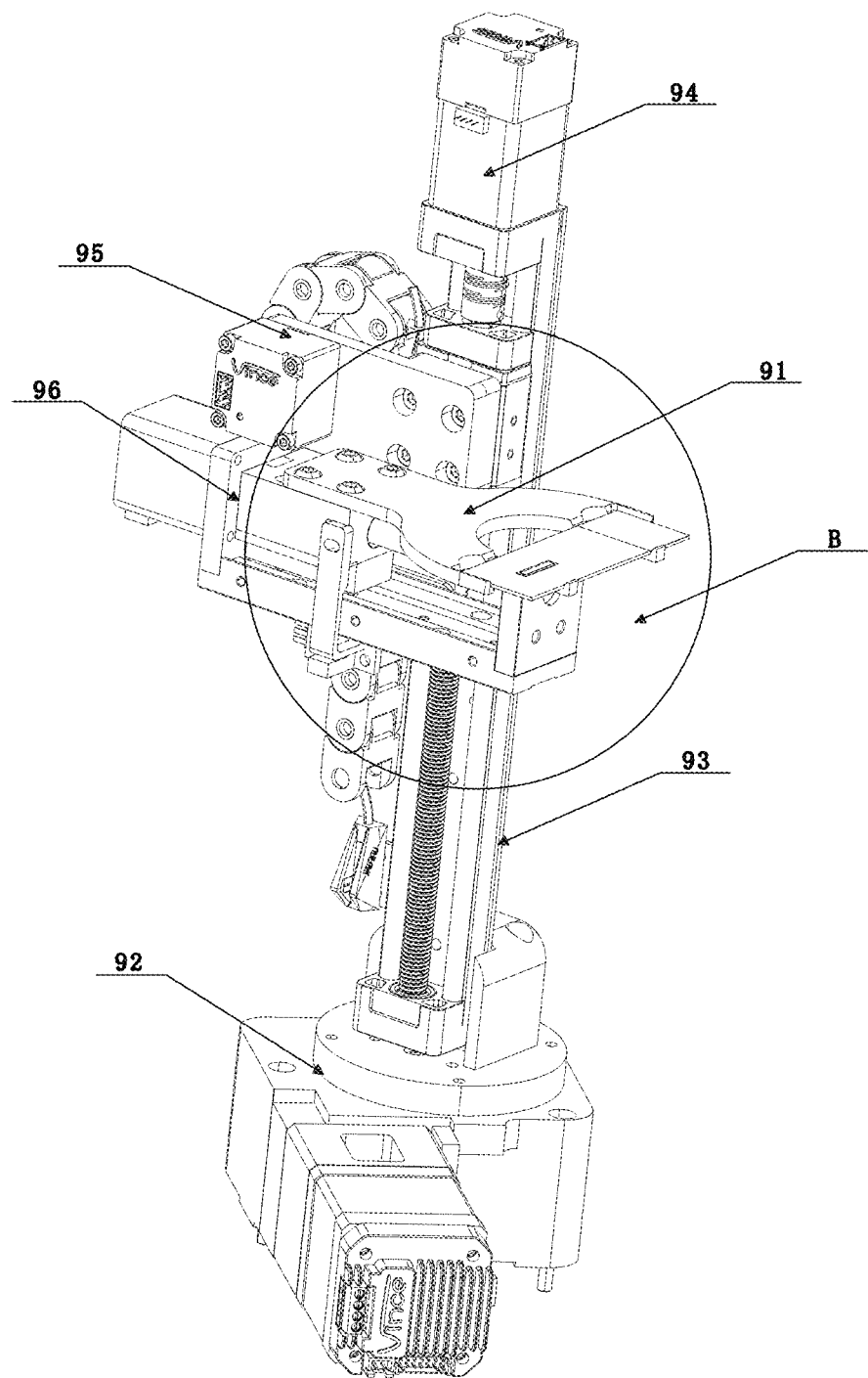
FIG. 7 is a perspective view of the slide transfer mechanism.

As shown in FIG. 7, the slide transfer mechanism 9 includes a transfer claw 91 and a rotating table 92 that drives the transfer claw 91 to rotate 360°. The rotating table 92 is fixed with a support block 93, and the support block 93 is provided with a first lifting mechanism 94 with the transfer claw 91 to lift and lower in the vertical direction. The first lifting mechanism 94 is provided with a lifting platform 95, and the lifting platform 95 is provided with a first mobile mechanism 96 that drives the transfer claw 91 to move linearly in the horizontal plane. The rotating table 92, the first lifting mechanism 94, and the first mobile mechanism 96 are all connected to the control module 7.

The structure of the rotating table 92 and the rotating mechanism 3 can be completely the same or slightly simplified, directly using a servo motor to rotate with a turntable. The first lifting mechanism 94 and the first mobile mechanism 96 both adopt a motor screw-nut structure.

Figure 8:
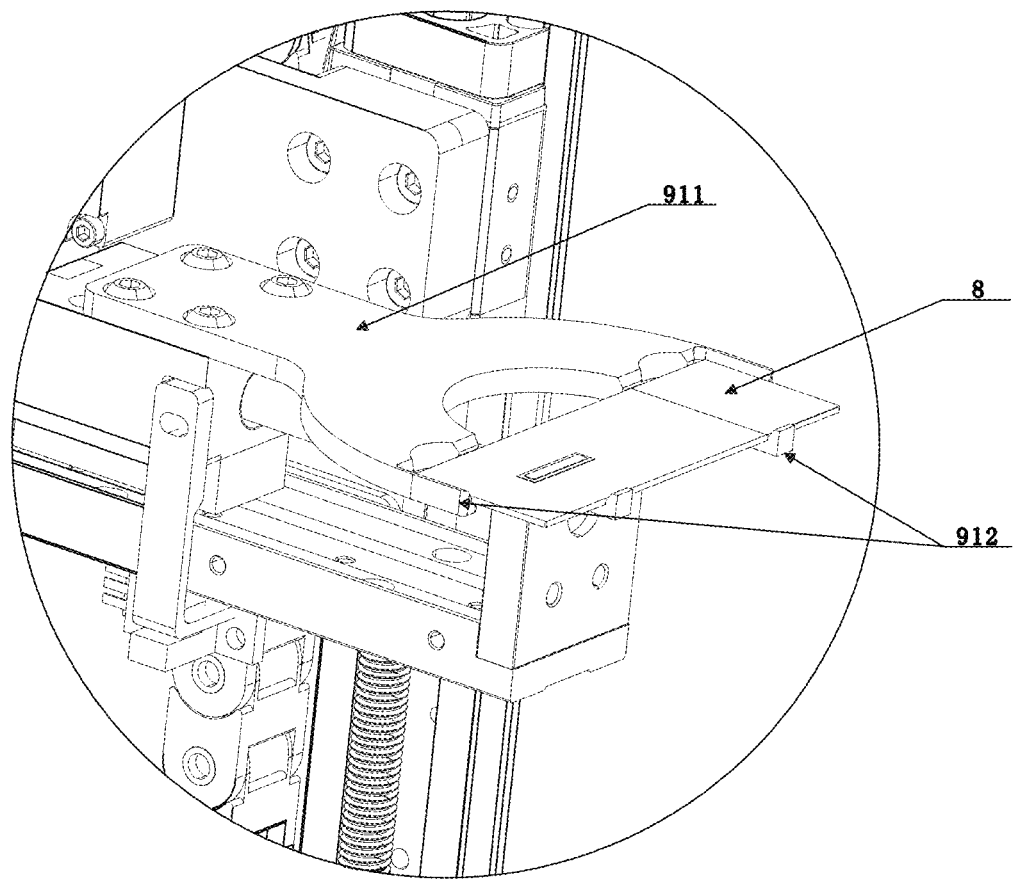
FIG. 8 is an enlarged view of part B in FIG. 7.

As shown in FIG. 8, the transfer claw 91 includes a plate-like member 911 fixed to the first mobile mechanism 96, and the non installation end of the plate-like member 911 forks to form a U-shape. The two arms of the U-shape fork are at least two extension strips 912 for supporting the slide 8, and the outermost extension strip 912 is provided with an L-shaped groove that contacts the edge of the slide 8. a receiving groove with a length equal to the maximum width of slide 8 is provided on the non outermost extension strip 912 for supporting slide 8. This technical solution prefers that the length of the outermost extension strip 912 is smaller than the length of the remaining extension strips 912.

After the transfer claw 91 is set to the above structure, the L-shaped groove and the receiving groove can stably limit the slide 8, so that when transferring the slide 8, it can prevent the slide 8 from sliding or vibration, and avoid the pollen adhered to the slide 8 from doping into adjacent areas.

Figure 12:
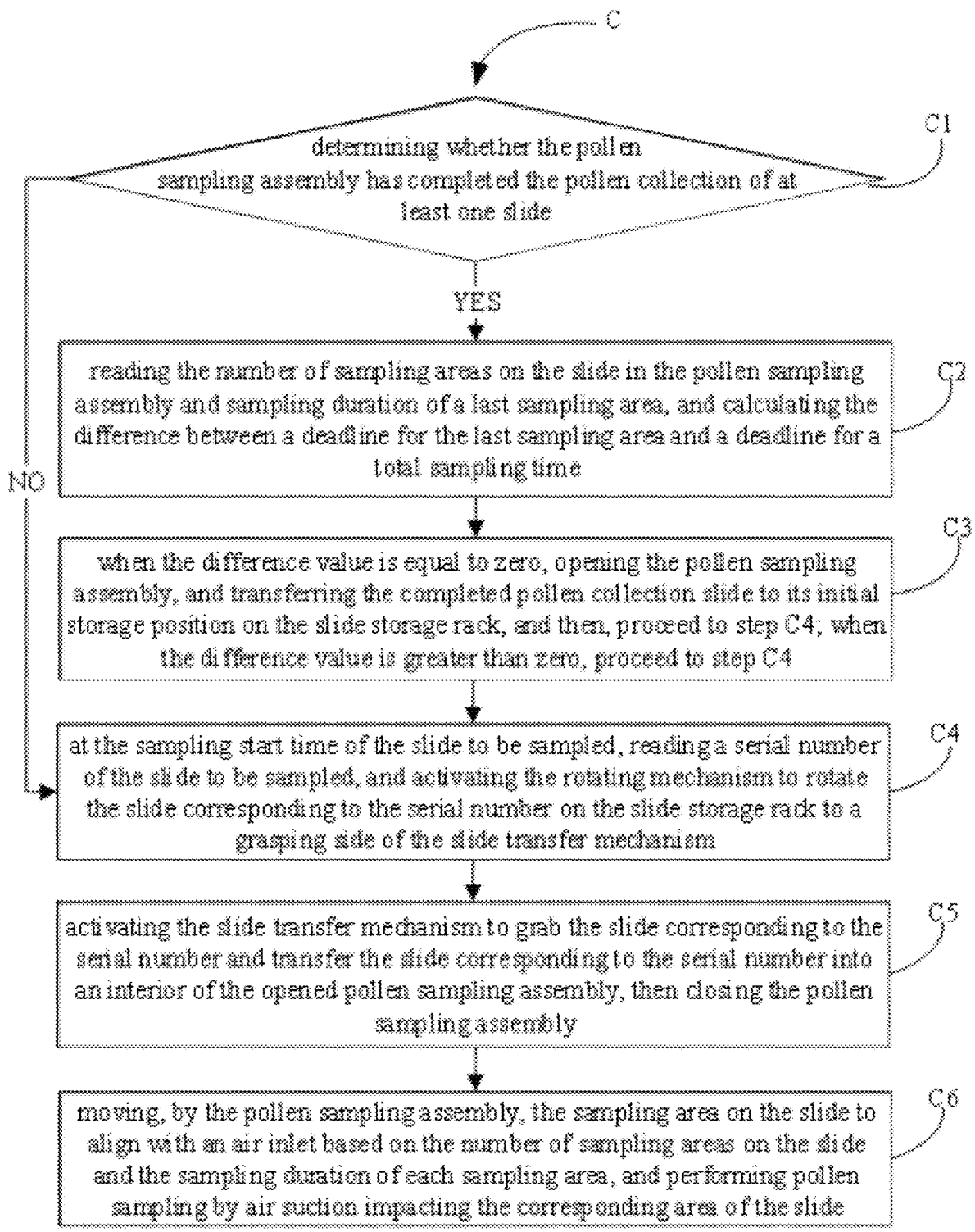
FIG. 12 is a flowchart of the control method for the intelligent pollen monitoring and analysis system.

Please refer to FIG. 12, it shows flow chart of a control method of the intelligent pollen monitoring and analysis system. As shown in FIG. 12, the method includes the following steps:

C1, determining whether the pollen sampling assembly 4 has completed the pollen collection of at least one slide 8; if yes, proceed to step C2, otherwise, proceed to step C4;

C2, reading the number of sampling areas on the slide 8 in the pollen sampling assembly 4 and sampling duration of a last sampling area, and calculating the difference between a deadline for the last sampling area and a deadline for a total sampling time;

C3, when the difference value is equal to zero, opening the pollen sampling assembly 4, and transferring the completed pollen collection slide 8 to its initial storage position on the slide storage rack 2, and then, proceed to step C4; when the difference value is greater than zero, proceed to step C4;

C4, at the sampling start time of the slide 8 to be sampled, reading a serial number of the slide 8 to be sampled, and activating the rotating mechanism 3 to rotate the slide 8 corresponding to the serial number on the slide storage rack 2 to a grasping side of the slide transfer mechanism 9;

C5, activating the slide transfer mechanism 9 to grab the slide 8 corresponding to the serial number and transfer the slide 8 corresponding to the serial number into an interior of the opened pollen sampling assembly 4, then closing the pollen sampling assembly 4;

C6, moving, by the pollen sampling assembly 4, the sampling area on the slide 8 to align with an air inlet based on the number of sampling areas on the slide 8 and the sampling duration of each sampling area, and performing pollen sampling by air suction impacting the corresponding area of the slide 8.

In one embodiment of the present disclosure, the control method of the intelligent pollen monitoring and analysis system further includes the following steps:

D1, determining whether a previous slide 8 that has been completed pollen collection is located on a grasping side of the slide transfer mechanism 9; if yes, proceed to step D3; otherwise, proceed to step D2;

D2, activating the rotating mechanism 3 to rotate the slide storage rack 2, causing the previous slide 8 that has completed pollen collection to rotate to the gripping side of the slide transfer mechanism 9;

D3, grasping the previous slide 8 that has completed pollen collection and transport the previous slide 8 that has completed pollen collection to the image acquisition device 5, and collecting image information of multiple images for each sampling area of the slide 8 in sequence;

D4, when the image information of multiple images in each sampling area of the slide have been collected 8, transferring the slide 8 to its initial storage position on the slide storage rack 2.

This technical solution uses slides 8 for pollen collection, and then cooperates with a slide transfer mechanism 9 to grasp the slides 8 for transfer. During the transfer process, a clamping method is used to transfer a single slide 8 without vibration, which can prevent pollen from entering adjacent sampling areas and ensure the accuracy of pollen concentration and quantity detection.

During the implementation process, preferably, the control method of the intelligent pollen monitoring and analysis system further includes adaptively adjusting air flow entering the pollen sampling assembly 4:

E1, during the process of conveying air from the exhaust fan to the pollen sampling assembly 4, collecting a flow rate value at an air inlet of the pollen sampling assembly 4;

E2, determining whether the flow value is within a preset threshold for air flow; if yes, proceed to step E7; otherwise, proceed to step E3;

E3, calculating a flow error value e, a cumulative flow error value i, and a flow error change rate d in a PID controller based on the flow value:

$$e = s - f, i = i_0 + e, d = e - p;$$

wherein, s is the preset threshold for air flow; f is the flow value; p is a previous flow error value; $i_0$ is the cumulative flow error value corresponding to the previous flow judgment;

E4, according to the flow error value, adjusting a proportional coefficient $q_l$, an integral coefficient $u_l$, and a differential coefficient $w_l$ of the PID controller corresponding to the flow rate:

$$\text{when } e < 1, q_l = q_{l0}, u_l = u_{l0}, w_l = w_{l0} * 0.5;$$

$$\text{when } e \geq 1, q_l = q_{l0} * 2, u_l = u_{l0}, w_l = w_{l0};$$

wherein, $q_{l0}$ is a threshold for the proportional coefficient; $u_{l0}$ is a threshold for the integral coefficient; $w_{l0}$ is a threshold for the differential coefficient;

E5, based on e, i, and d, as well as $q_l$, $u_l$, and $w_l$, updating an output value out of the PID controller corresponding to the flow rate:

$$out_l = q_l * e + u_l * i + w_l * d;$$

E6, adjusting output power of the exhaust fan according to the output value $out_l$, so that the flow rate at the air inlet is within the preset threshold for air flow; after a preset time, return to step E1;

E7, resetting the flow error value e to zero, and then return to step E1 after the preset time.

Due to the fact that the intelligent pollen monitoring and analysis system of this technical solution is placed outdoors for pollen collection, the outdoor air is affected by factors such as airflow and wind speed, which can affect the gas flow entering the pollen sampling chamber 41, thereby affecting the concentration of collected pollen. In order to avoid interference from the external environment, this technical solution collects the intake air flow rate to determine whether the air flow entering the pollen sampling chamber 41 is stable or not, so as to adjust the output power of the exhaust fan based on the collected air flow rate, thereby ensuring that the intake air flow rate is within a certain range.

Due to the differences in the types of plants that bloom in different seasons, there are also significant differences in pollen concentration in the air. For example, in spring, there are many flowering plants, and the pollen concentration in the air is high. If the collection time is long, the pollen on slide 8 will overlap, affecting the accurate identification of pollen concentration or quantity.

In view of above, the control method of the intelligent pollen monitoring and analysis system further includes an anti-accumulation and overlap prevention method for pollen sampling on the slide 8, and the method S includes the steps S1 to S8.

This technical solution divides the entire sampling area on the slide 8 into 30 small sampling areas. During the anti-accumulation and overlap prevention implementation process, a virtual coordinate system will be established for the slide 8, and the coordinate information of each sampling area will be recorded during scanning and photography. After the first sampling, the sampled result image will be obtained, and the X-axis information of the image coordinates can be used to determine the sampling area to which the image belongs. For example, the X-axis range is between 46-50, it is the first sampling area, and the X-axis range is between 41-45, it is the second sampling area. The calculation formula for the minimum value Xmin and the maximum value Xmax of the X-axis range of any sampling area n is: Xmin=46−5*n, Xmax=50−5*n.

At the initial sampling time of this technical solution, the total sampling time for a single slide 8 is one day, and the initial value of the sampling duration is 24 h/N, where N is the total number of initial sampling areas. When conducting pollen sampling, the starting time for sampling pollen in each sampling area is recorded and timed, and when the timing duration is equal to its corresponding sampling duration, the sampling of the sampling area is stopped.

After the first sampling and scanning, images of each sampling area can be obtained, and the anti-accumulation and overlap prevention control method of this technical solution can be used to adjust the sampling step size and the total number of sampling areas of the next slide 8 to avoid pollen overlap or excessive dispersion in each sampling area.

S1, collecting image information of multiple images for each sampling area of the current slide 8, and preprocess the multiple images to obtain grayscale images, wherein the current slide 8 is the most recent slide that has been completed pollen collection.

Preferably, 5 images are collected for each sampling area in this technical solution, specifically by dividing each sampling area into 5 equal parts and collecting one image for each equal part of each area.

S2, calculating a grayscale value of each pixel in the grayscale images, and determining a count value of pixels in a black area of each sampling area based on the grayscale value.

During implementation, the preferred step S2 of this technical solution further includes:

S21, calculating the grayscale value of each pixel in the grayscale image Gray:

$$Gray = 0.299*R + 0.587*G + 0.114*B$$

In the formula, R, G, and B are the values of the red, green, and blue channels for each pixel in the grayscale image, respectively;

S22, setting the pixels with grayscale values less than the grayscale threshold to zero, and the pixels with grayscale values greater than or equal to the grayscale threshold to 255;

S23, counting the total number of zero pixels in the same grayscale image, and calculating the average of the total number of pixels in all grayscale images in the same sampling area as the count value.

S3, determining whether all sampling ratios of the current slide 8 are greater than 1 or whether the number of sampling areas on the current slide 8 is less than the total number of initial sampling areas; if yes, proceed to step S6; otherwise, proceed to step S4.

S4, updating an output value out of the PID controller based on the count value of each sampling area, and updating the sampling ratio Pr=sampling ratio Pr+out$_1$.

In one embodiment of the present disclosure, the method of updating the output out$_1$ of the PID controller includes:

S41, calculating the error value Errvalue, cumulative error value Intvalue, and error change rate Dervalue in the PID controller based on the count values in the sampling area;

$$Errvalue = Setvalue - Curvalue$$
$$Intvalue = Intvalue_0 + Errvalue$$
$$Dervalue = Errvalue - Preverror$$

Wherein, Setvalue is the preset threshold; Curvalue is the count value; Preverror is the error correction value; Intvalue0 is the cumulative error value of the previous slide corresponding sampling area.

During implementation, the preferred method for obtaining error correction values in this embodiment includes:

B1, determining whether at least two error values of the slide 8 have been recorded before the collection of the current slide 8 in the current month; if yes, proceed step B2, otherwise, proceed step B4;

B2, calculating the average error value of all slides 8 in the current month corresponding to the same sampling area of the current slide 8;

B3, obtaining the error value of the sampling area of the previous slide 8 corresponding to the current sampling area of the current slide 8, and calculating the average of the error value and the mean as the final error correction value;

B4, using the error value of the previous slide 8 corresponding to the same sampling area of the current slide 8 as the error correction value.

S42, determining the proportional coefficient Kp, the integral coefficient Ki, and the differential coefficient Kd in the PID controller based on the error value and the preset threshold:

When abs(Errvalue − Setvalue) < Th1: $Kp = 0, Ki = 0, Kd = 0$;

When Th1 < abs(Errvalue − Setvalue) < Th2: $Kp = Kp_0$, $$Ki = 10*Ki_0, Kd = Kd_0;$$

When Th2 < abs(Errvalue − Setvalue): $Kp = 10*Kp_0$, $$Ki = Ki_0, Kd = Kd_0;$$

Wherein, abs(.) is the absolute value function; Th1 and Th2 are the upper and lower threshold limits, respectively; Kp$_0$, Ki$_0$, and Kd$_0$ are the proportional coefficient, the integral coefficient, and the differential coefficient of the sampling area corresponding to the previous slide, respectively.

S43, updating the output value out of the PID controller based on Errvalue, Intvalue, Dervalue, Kp, Ki, and Kd:

$$Out_1 = Kp*Errvalue + Ki*Intvalue + Kd*Dervalue.$$

In order to improve the predictive performance of this technical solution for the future, it is preferred that between steps S42 and S43, this technical solution further includes:

A1, determining whether at least one slide 8 has been collected before the current slide 8 collection in the current month; if yes, proceed to step A2; otherwise, proceed to step S43 directly;

A2, increasing the differential coefficient Kd obtained in step S42 by a preset multiple, and then proceed to step S43.

S5, when Pr≥1, the sampling duration of the sampling area corresponding to the next slide 8 is equal to the sampling duration of the current slide 8; when Pr<1, the sampling duration of the sampling area corresponding to the next slide 8 is Ts×Pr;

S6, selecting the maximum count value from all sampling areas of the current slide 8 as a overlapping degree feedback value;

S7, based on the overlapping degree feedback value, updating an output value $out_2$ of the PID controller, and updating the number of sampling areas St=St+int ($out_2$), wherein int is a rounding function;

The method of updating the output $out_2$ of the PID controller includes:

S71, based on the feedback value of the overlapping degree of the current slide 8, calculating the overlapping error value Errvale2, the cumulative overlapping error value Intvalue2, and the overlapping error change rate Dervalue2 in the PID controller:

$$Errvalue2 = Setvalue2 - Curvalue2;$$

$$Intvalue2 = Intvalue2_0 + Errvalue2;$$

$$Dervalue2 = Errvalue2 - Intvalue2_0.$$

Wherein, Curalue2 is the feedback value of overlapping degree; Setvalue2 is the preset parameter value; $Intvalue2_0$ is the overlapping error value corresponding to the previous updated sampling duration;

S72, updating the overlapping ratio coefficient Kp2, the overlapping differential coefficient Ki2, and the overlapping integral coefficient Kd2:

When $Curvalue < Thmin$; $Kp2 = 10 * Kp2$, $Ki2 = Ki2$, $Kd2 = 0$;

When $Thmin \leq Curvalue2 < Thmax$; $Kp2 = 0$, $Ki2 = Ki2$, $Kd2 = 0$;

When $Thmax \leq Curvalue2$; $Kp2 = 10 * Kp2$, $Ki2 = Ki2$, $Kd2 = 0$;

Wherein, $Kp2_0$ and $Ki2_0$ are the overlapping ratio coefficient and the overlapping differential coefficient corresponding to the previous updated sampling duration, respectively; Thmin and Thmax are the lower and upper limits of the overlapping degree threshold, respectively.

S73, calculating the output value $out_2$ of the PID controller:

$$Out2 = Kp2 * Errvalue2 + Ki2 * Intvalue2 + Kd2 * Dervalue2.$$

S8, based on the total sampling time Cy and the number of sampling areas St of a single slide 8, updating the sampling duration Ts=Cy/St for the sampling area of the next slide 8, wherein the sampling duration for each sampling area is equal to Ts.

This technical solution determines the number of pixels in the black area of the sampling area based on the grayscale values of the pixels in the image of the sampling area. Then, based on the conditions set in step S3, the sampling ratio of each sampling area is adjusted by combining the output of the PID controller when the conditions are not met, in order to avoid overlapping pollen collected in the sampling area. When the conditions are met, by adjusting the number of sampling areas to avoid excessive dispersion of pollen in the sampling area; or if the number of sampling areas is too small, there may still be pollen overlap despite adjusting the sampling ratio.

This technical solution analyzes the overlap and dispersion of pollen on slide 8 that has recently completed pollen collection, in order to adjust the sampling duration for each sampling area or the number of sampling areas to avoid the situation of pollen overlap or excessive dispersion which will affect the accurate statistics of pollen quantity when the next slide 8 is used for pollen sampling, thereby ensuring the accuracy of subsequent pollen quantity statistics and pollen contour recognition.

After the sampling of one slide 8 is completed in this technical solution, steps S1 to S8 are executed once. The entire method includes several steps S1 to S8, such as terminating the algorithm every 30 times; when starting the control method of this technical solution afterwards, initializing all parameters.

In summary, the intelligent pollen monitoring and analysis system and its control method can achieve accurate collection of pollen concentration. During the collection process, they can also prevent interference from the external environment and prevent pollen overlap when the airborne pollen concentrations is high.

What is claimed is:

1. A control method of an intelligent pollen monitoring and analysis system, wherein the intelligent pollen monitoring and analysis system comprises:
   a monitoring box;
   a control module installed inside the monitoring box;
   a support platform installed inside the monitoring box;
   a slide storage rack provided in the support platform, configured to store multiple slides that are not overlapped to each other;
   a pollen sampling assembly, configured to inhale external ambient air and collect pollen from the air onto the slides inside through a volumetric method;
   an image acquisition device, configured to enlarge pollen images on the slides for image acquisition; and
   a slide transfer mechanism, configured to grab the slides on the slide storage rack and transfer the slides grabbed to the pollen sampling assembly and the image acquisition device;
   wherein the slide storage rack is arranged on a rotating mechanism, the image acquisition device is provided with a fine-tuning mechanism to adjust the slide in X-Y-Z directions, the rotating mechanism, the pollen sampling assembly, the image acquisition device, the slide transfer mechanism, and the fine-tuning mechanism are all connected to the control module;
   the control module is configured to control start and stop of the connected components, recognize pollen concentration and/or pollen quantity from the pollen images uploaded by the image acquisition device, and send the pollen images and the concentration and/or the pollen quantity to the external management end;
   the control module comprises a microcomputer and an electrical box that are interconnected;
   the rotating mechanism, the pollen sampling assembly, the image acquisition device, the slide transfer mechanism, and the fine-tuning mechanism are all connected to the electrical box and a backup power supply;
   the microcomputer is embedded with an execution program for controlling the rotating mechanism, the pollen sampling assembly, the image acquisition device, the slide transfer mechanism, and the fine-tuning mechanism, the microcomputer is connected to an input module placed inside the monitoring box, and the input module is configured to adjust the embedded execution program;

an inner side of a door panel of the monitoring box is fixed with a monitor that is electrically connected to the microcomputer, the monitoring box is further provided with a temperature sensor, a humidity sensor, an air conditioner that maintains an internal temperature of the monitoring box at a preset temperature, and a dehumidifier that performs dehumidification when an internal humidity of the monitoring box exceeds a preset humidity, and the temperature sensor, the humidity sensor, the air conditioner, and the dehumidifier are all electrically connected to the control module;

the control method of the intelligent pollen monitoring and analysis system comprises following steps:

C1, determining whether the pollen sampling assembly has completed the pollen collection of at least one slide, if yes, proceed to step C2, otherwise, proceed to step C4;

C2, reading a number of sampling areas on the slide in the pollen sampling assembly and sampling duration of a last sampling area, and calculating the difference between a deadline for the last sampling area and a deadline for a total sampling time;

C3, when the difference value is equal to zero, opening the pollen sampling assembly, and transferring the completed pollen collection slide to its initial storage position on the slide storage rack, and then, proceed to step C4, when the difference value is greater than zero, proceed to step C4;

C4, at the sampling start time of the slide to be sampled, reading a serial number of the slide to be sampled, and activating the rotating mechanism to rotate the slide corresponding to the serial number on the slide storage rack to a grasping side of the slide transfer mechanism;

C5, activating the slide transfer mechanism to grab the slide corresponding to the serial number and transfer the slide corresponding to the serial number into an interior of the opened pollen sampling assembly, then closing the pollen sampling assembly;

C6, moving, by the pollen sampling assembly, the sampling area on the slide to align with an air inlet based on the number of the sampling areas on the slide and the sampling duration of each sampling area, and performing pollen sampling by air suction impacting the corresponding area of the slide.

2. The intelligent pollen monitoring and analysis system according to claim 1, wherein the control method of the intelligent pollen monitoring and analysis system further comprises:

D1, determining whether a previous slide that has been completed pollen collection is located on a grasping side of the slide transfer mechanism; if yes, proceed to step D3; otherwise, proceed to step D2;

D2, activating the rotating mechanism to rotate the slide storage rack, causing the previous slide that has completed pollen collection to rotate to the gripping side of the slide transfer mechanism;

D3, grasping the previous slide that has completed pollen collection and transport the previous slide that has completed pollen collection to the image acquisition device, and collecting image information of multiple images for each sampling area of the slide in sequence;

D4, when the image information of multiple images in each sampling area of the slide have been collected, transferring the slide to its initial storage position on the slide storage rack.

3. The intelligent pollen monitoring and analysis system according to claim 1, wherein the control method of the intelligent pollen monitoring and analysis system further comprises adaptively adjusting air flow entering the pollen sampling assembly:

E1, during the process of conveying air from the exhaust fan to the pollen sampling assembly, collecting a flow rate value at an air inlet of the pollen sampling assembly;

E2, determining whether the flow value is within a preset threshold for air flow; if yes, proceed to step E7; otherwise, proceed to step E3;

E3, calculating a flow error value e, a cumulative flow error value i, and a flow error change rate d in a PID controller based on the flow value:

$$e = s - f, i = i_0 + e, d = e - p;$$

wherein, s is the preset threshold for air flow; f is the flow value; p is a previous flow error value; $i_0$ is the cumulative flow error value corresponding to the previous flow judgment;

E4, according to the flow error value, adjusting a proportional coefficient $q_l$, an integral coefficient $u_l$, and a differential coefficient $w_l$ of the PID controller corresponding to the flow rate:

$$\text{when } e < 1, q_l = q_{l0}, u_l = u_{l0}, w_l = w_{l0} * 0.5;$$

$$\text{when } e \geq 1, q_l = q_{l0} * 2, u_l = u_{l0}, w_l = w_{l0};$$

wherein, $q_{l0}$ is a threshold for the proportional coefficient; $u_{l0}$ is a threshold for the integral coefficient; $w_{l0}$ is a threshold for the differential coefficient;

E5, based on e, i, and d, as well as $q_l$, $u_l$, and $w_l$, updating an output value out of the PID controller corresponding to the flow rate:

$$out_l = q_l * e + u_l * i + w_l * d;$$

E6, adjusting output power of the exhaust fan according to the output value $out_l$, so that the flow rate at the air inlet is within the preset threshold for air flow; after a preset time, return to step E1;

E7, resetting the flow error value e to zero, and then return to step E1 after the preset time.

4. The intelligent pollen monitoring and analysis system according to claim 1, wherein the control method of the intelligent pollen monitoring and analysis system further comprises an anti-accumulation and overlap prevention method for pollen sampling on the slide:

S1, collecting image information of multiple images for each sampling area of the current slide, and preprocess the multiple images to obtain grayscale images, wherein the current slide is the most recent slide that has been completed pollen collection;

S2, calculating a grayscale value of each pixel in the grayscale images, and determining a count value of pixels in a black area of each sampling area based on the grayscale value;

S3, determining whether all sampling ratios of the current slide are greater than 1 or whether the number of sampling areas on the current slide is less than the total number of initial sampling areas; if yes, proceed to step S6; otherwise, proceed to step S4;

S4, updating an output value $out_1$ of the PID controller based on the count value of each sampling area, and updating the sampling ratio Pr=sampling ratio Pr+$out_1$;

S5, when Pr≥1, the sampling duration of the sampling area corresponding to the next slide is equal to the sampling duration of the current slide; when Pr<1, the sampling duration of the sampling area corresponding to the next slide is Ts×Pr;

S6, selecting the maximum count value from all sampling areas of the current slide as a overlapping degree feedback value;

S7, based on the overlapping degree feedback value, updating an output value $out_2$ of the PID controller, and updating the number of sampling areas St=St+int($out_2$), wherein int is a rounding function;

S8, based on the total sampling time Cy and the number of sampling areas St of a single slide, updating the sampling duration Ts−Cy/St for a sampling area of the next slide, wherein the sampling duration for each sampling area is equal to Ts.

* * * * *